March 18, 1952     D. ANDERSON     2,589,918
GRAPPLE FOR HANDLING BARRELS
Filed March 6, 1948

Doyle Anderson    INVENTOR.
BY H. G. Burns
Attorney.

Patented Mar. 18, 1952

2,589,918

UNITED STATES PATENT OFFICE 2,589,918

GRAPPLE FOR HANDLING BARRELS

Doyle Anderson, Fort Wayne, Ind.

Application March 6, 1948, Serial No. 13,510

4 Claims. (Cl. 294—106)

This invention relates to improvements in a grapple for handling barrels, casks, drums and the like used for transporting various liquids, such as prepared beverages.

Customarily, beverages, such as soft drinks, are conveniently prepared in an establishment especially equipped for that purpose, loaded in suitable casks, which are then transported to other establishments where the liquid is bottled for subsequent distribution to dealers and consumers generally. This method ordinarily requires transfer of the liquid from the casks to a receiving vat from whence it is piped to machinery for bottling. It is essential that the supply of liquid to the bottling machinery be continuously maintained necessitating rapid handling of the casks.

An object of the instant invention is to afford easily-operated apparatus by which the casks are elevated, turned upon their longitudinal axes while suspended so their bung openings are in lowermost position, and maneuvered over the vat so that, upon removal of their bungs, the liquid from the casks flows directly into the vat through a receiving opening therein.

A further object of the invention is to afford facility for removing the casks from the vat after being emptied, turning the casks so their bung openings are in uppermost position, thus to prevent dripping of dregs from the casks, and then returning them onto the adjacent floor without damage.

Other objects and advantages of the invention appear in the following description.

Figure 1:
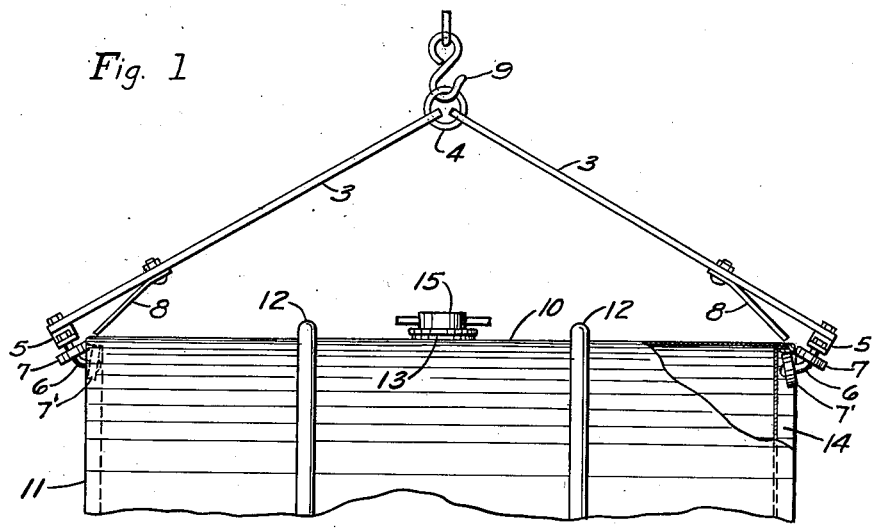
Figure 2:
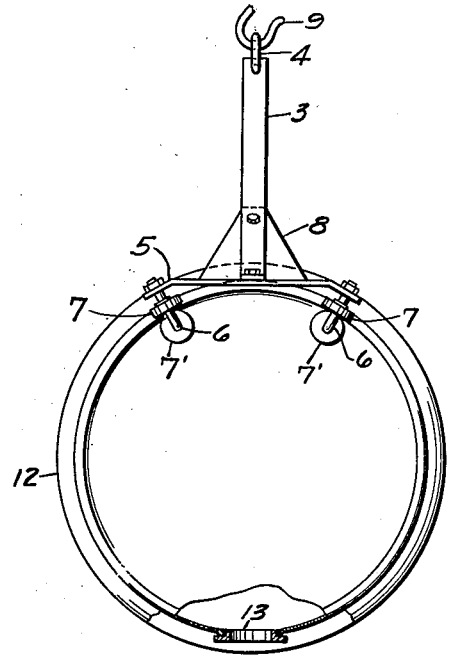

An illustrative embodiment of the invention is shown in the acompanying drawings, in which:

Fig. 1 is a side elevational view of a structure in which the invention is incorporated, a fragmentary illustration of a cask, suspended in connection therewith, partially in section, being included in the view; and Fig. 2 is an end elevational view of the structure shown in Fig. 1, portions of the cask being broken away and with the cask in emptying position.

The illustrative embodiment of the invention consists of a grapple in which are provided oppositely disposed arms 3 the inner ends of which are linked together by a common ring 4 on which they have swinging movement. The outer end of each arm has secured thereon a cross-head 5 the opposite ends of which have secured thereon downwardly extending studs 6 on each of which are mounted proximal and distal rollers 7—7', preferably having ball bearings, suitably spaced apart from each other. That portion of each stud between the rollers is bent angularly so the axes upon which the rollers revolve are divergent.

Each arm 3 has secured to its lower face, spaced suitably distant from the cross-head 5 a guide-plate 8, preferably of spring metal, the free end of which extends closely adjacent the corresponding proximal roller 7.

The grapple thus constructed is suspended from a suitable hoist or traveling crane (not shown) such as are in common use, connection of the grapple with the hoist being preferably by means of a hook 9.

The cask 10 shown in the drawings is of the usual cylindrical type having end chines 11, a pair of circumferential treads 12 on its midportion spaced apart from each other, and a bung fixture 13 located in the shell of the cask between the treads.

In use, the cask, loaded with liquid, is rolled on the floor upon its treads and brought to rest at a place in proximity to a receiving vat (not shown). The grapple, while suspended from the hook 9 is lowered by operation of the hoist, and the arms of the grapple are then spread outwardly and placed astride the cask so the guideplates 8 bear upon the opposite chines 11. The grapple, when elevated by the hoist, is accompanied by movement of the proximal rollers 7 into bearing contact against the outer end faces of the corresponding chines on the cask, and engagement of the distal rollers 7' upwardly against the inner faces 14 of the chines, movement of the rollers into proper engaging positions being facilitated by guidance of the plates 8 which have sliding movement on the chines as the grapple is raised.

After the grapple is thus attached, the cask is elevated suitably distant from the floor by operating the hoist, and while held suspended is manually rotated upon its longitudinal axis until the bung fixture 13 is in uppermost position. The seal (not shown) that ordinarily closes the bung fixture during shipment is then removed and replaced by a suitable temporary bung 15, after which the cask is again rotated upon its axis so the bung fixture is disposed in its lowermost position. The cask then is maneuvered, by operating the hoist, into emptying position over the vat so that upon removal of the bung the liquid content of the cask flows gravitally into the vat through its receiving opening.

After the cask has been emptied, it is again rotated until its bung fixture is in uppermost position, after which the cask is maneuvered, by operation of the hoist, back onto the floor where the bung opening is resealed in readiness for reshipment to the establishment where originally filled.

By use of the invention as set forth, transfer of the liquid from its source to the vat and return of the cask to the source is accomplished with dispatch without loss and in a manner to promote sanitation.

Variations from the particular construction above disclosed may be restorted to by the exercise of skill in the art, without departure from the spirit or scope of the invention.

What I claim is:

1. A grapple for handling casks consisting of a pair of oppositely disposed arms linked together adapted for connection with a hoist, the outer ends of said arms having corresponding cross-heads provided on their ends with downwardly extending studs, proximal and distal rollers disposed on said studs arranged to rotate relatively on divergent axes, and guide-plates on said arms located adjacent the cross-heads thereon that slide upon the chines of said casks, whereby said rollers are directed into engaging position with the casks as the grapple is raised by said hoist.

2. A grapple for handling casks consisting of a pair of oppositely disposed linked arms, adapted for connection with a hoist, the outer ends of said arms having corresponding cross-heads provided with downwardly extending studs, the axes of which are relatively divergent and proximal and distal rollers disposed on said studs engageable with the corresponding chines of said cask.

3. A grapple for handling casks adapted to be suspended from a hoist and having adjustable oppositely outspread arms provided with cross-heads on their outer ends, proximal and distal rollers supported in connection with the opposite ends of said cross-heads engageable respectively with the outer end faces of the chines of said casks and the inner faces thereof; and guide-plates on said arms located adjacent said proximal rollers having sliding movement on the exterior walls of the corresponding chines when the grapple is raised by said hoist, whereby the rollers are directed into engagement with said chines.

4. A grapple for handling casks, said grapple being adapted to be suspended from a hoist and having adjustable oppositely outspread linked arms, a cross-head on the outer end of each arm, and proximal and distal rollers supported in connection with the opposite ends of said cross-heads engageable respectively with the outer end faces of the chines of said casks and the inner faces thereof.

DOYLE ANDERSON.

REFERENCES CITED

The following references are of record in the file of this patent:

UNITED STATES PATENTS

| Number | Name | Date |
| --- | --- | --- |
| 551,167 | Kobold | Dec. 10, 1895 |
| 630,366 | LeVan | Aug. 8, 1899 |
| 693,097 | Baldwin | Feb. 11, 1902 |
| 1,376,414 | Farnsworth | May 3, 1921 |
| 2,273,657 | Owen | Feb. 17, 1942 |